(12) United States Patent
Aronowicz

(10) Patent No.: US 7,644,683 B2
(45) Date of Patent: Jan. 12, 2010

(54) METHOD AND APPARATUS FOR CULTURING MARINE LARVAE

(76) Inventor: Jochanan Aronowicz, 1168 West 54th Avenue, Vancouver, British Columbia (CA) V6P 1N1

( * ) Notice: Subject to any disclaimer, the term of this patent is extended or adjusted under 35 U.S.C. 154(b) by 134 days.

(21) Appl. No.: 11/855,873

(22) Filed: Sep. 14, 2007

(65) Prior Publication Data
US 2009/0050066 A1 Feb. 26, 2009

(30) Foreign Application Priority Data
Aug. 20, 2007 (CA) .................. 2597965

(51) Int. Cl.
*A01K 61/00* (2006.01)
(52) U.S. Cl. ................ 119/211; 119/209; 119/205; 119/226
(58) Field of Classification Search ......... 119/200–211, 119/213–218, 223–227, 234, 236, 238–240
See application file for complete search history.

(56) References Cited

U.S. PATENT DOCUMENTS

| | | | | |
|---|---|---|---|---|
| 4,392,454 | A * | 7/1983 | Dugan et al. ............. | 119/213 |
| 4,495,891 | A * | 1/1985 | Dugan et al. ............. | 119/211 |
| 5,762,024 | A * | 6/1998 | Meilahn .................... | 119/223 |
| 6,024,050 | A * | 2/2000 | Rheault .................... | 119/238 |
| 6,223,689 | B1 * | 5/2001 | Nelson ..................... | 119/234 |
| 6,659,043 | B1 * | 12/2003 | Huska ...................... | 119/226 |
| 6,892,672 | B2 * | 5/2005 | Klein ....................... | 119/223 |

OTHER PUBLICATIONS

Greve, W., "The 'Planktonkreisel', a New Device for Culturing Zooplankton," Marine Biol. 1(3):201-203, 1968.
Hoeg, J., "A Culture System for Rearing Marine Invertebrate Larvae and its Application to Larvae of Rhizocephalan Barnacles," J. Exp. Mar. Biol. Ecol. 84:167-172, 1984.
Strathmann, R., "The Feeding Behavior of Planktotrophic Echinoderm Larvae: Mechanisms, Regulation, and Rates of Suspension-Feeding," J. Exp. Mar. Biol. Ecol. 6:109-160, 1971.
Strathmann, R., "Reproduction and Development of Marine Invertebrates of the Northern Pacific Coast: Data and Methods for the Study of Eggs, Embryos, and Larvae," University of Washington Press, Seattle and London, 1987, pp. 15-17.
Ward. W., "Aquarium Systems for the Maintenance of Ctenophores and Jellyfish and for the Hatching and Harvesting of Brine Shrimp (*Artemia salina*) Larvae," Chesapeake Sci. 15:116-118, 1974.

* cited by examiner

*Primary Examiner*—T. Nguyen
(74) *Attorney, Agent, or Firm*—Seed IP Law Group PLLC

(57) ABSTRACT

An agitator is provided including an open system having a base holding a plurality of culturing beakers as well as a lid holding a tube transporting fresh seawater into each beaker, gently stirring the water within and eliminating any decaying embryos. Each beaker has at least a bottom made of mesh allowing water to flow through. The agitator can be used to culture any fragile planktonic organisms that require an extended rearing time.

3 Claims, 9 Drawing Sheets

METHOD AND APPARATUS FOR CULTURING MARINE LARVAE

FIELD OF THE INVENTION

The present invention relates to apparatus for culturing marine animals and more particularly to agitators for culturing invertebrate larvae or juveniles.

BACKGROUND OF THE INVENTION

Culturing marine invertebrate larvae and other zooplankton is often difficult. In particular, it is difficult to rear large numbers of invertebrate larvae and other zooplankters for gene expression studies, or to establish healthy cultures for exposure to a variety of experimental conditions.

Prior art methods for rearing marine invertebrate larvae include a method for stirring larval cultures within closed containers using paddles, as disclosed in Strathmann R R (1971), "The Feeding Behavior of Planktotrophic Echinoderm Larvae: Mechanisms, Regulation and Rates of Suspension-feeding", J Exp Mar Biol Ecol 6: 109-160. An alternative method in the art uses water droplets, as disclosed in Hadfield as quoted in Strathmann M F (1987), "Reproduction and Development of Marine Invertebrates of the Northern Pacific Coast: Data and Methods for the Study of Eggs, Embryos, and Larvae", University of Washington Press, Seattle and London. Such methods maintain a high concentration of algal food sources for the planktotrophic larvae, but they are not self-cleaning, as water is not continuously cleared from the culturing vessel.

There are techniques in the prior art for rearing marine organisms in an open aquarium having constantly running seawater exiting through a mesh-covered opening. These are inconvenient as more fragile organisms tend to get caught on the mesh-covered opening, due to the excessive force of the water flow. Devices that circumvent this problem are designed to generate gentle water flows, as disclosed in Greve W (1968), "The "Planktonkreisel", a New Device for Culturing Zooplankton", Mar Biol 1: 201-203; and Ward W W (1974), "Aquarium Systems for the Maintenance of Ctenophores and Jellyfish and for the Hatching and Harvesting of Brine Shrimp (*Artemia salina*) Larvae", Chesapeake Sci 15: 116-118, but they are not a good option for culturing more robust lecithotrophic larvae because they provide insufficient agitation to clear out debris and yolk from eggs that fail to develop properly. A system of cages suspended in flowing water, as disclosed in Høeg J T (1984), "A Culture System for Rearing Marine Invertebrate Larvae and its Application to Larvae of Rhizocephalan Barnacles", J Exp Mar Biol Ecol 84: 167-172, also does not allow for easy manipulation, sampling, stirring, and collection of individuals in culture, nor does it keep some types of buoyant larvae from being forced onto the ceiling of the enclosure.

SUMMARY OF THE INVENTION

The apparatus according to the invention circulates larvae, provides an easy mode of collection, labeling, and cleaning, is scalable and has many possible applications. The apparatus can be deployed quickly, and as it does not require any electric or mechanical components, is ideal for short and long-term work at marine stations with running seawater, and is especially suited to culturing non-feeding larvae.

An apparatus for culturing individuals of a marine species is provided including a base supporting a plurality of culture containers, such as beakers, a portion of each of the culture containers submersible within a sea table, the portion of each of the culture container having a mesh surface; and a seawater supply, the seawater supply providing a flow of seawater from a seawater source to each of the culture containers; wherein the mesh surface allows passage of said seawater through the culture containers but prevents passage of the individuals.

The mesh surfaces may be at the bottom of each of the culture containers. The bottom of the culture container may be suspended above a surface of the sea table. The apparatus may include a lid that positions the seawater supply. The lid, itself, may be positioned above the base.

The seawater supply may be a tube in fluid communication with and drawing seawater from the seawater source. The tube may have a plurality of apertures, each of the apertures positioned above a culture container. Each of the apertures may hold a water conduit for providing a stream of seawater from the tube to the container. The lid may have a plurality of apertures, each of the apertures on the lid alignable with the apertures on the base, thereby allowing access to the containers. A plurality of clamps below the lid may position the water conduit.

An apparatus for culturing individuals of a marine species is provided, including means for holding the individuals within a container positionable within a sea table; means for allowing seawater to enter and pass through the container; and means for allowing waste to exit the container.

A method of cultivating individuals of a marine species is provided, including steps of: providing a container for containing said individuals, said container positioned within a sea table, said container having a mesh surface through which said individuals cannot pass; and providing a flow of seawater into and out of said container, said seawater removing waste from said container. The mesh surface may be positioned at the bottom of the container and above a surface of the sea table and the seawater may be provided by a supply tube accessing a seawater source.

DETAILED DESCRIPTION OF THE INVENTION

The apparatus according to the invention, includes agitator 1, which uses the supply of seawater typically found at a location such as a marine field station, and stirs delicate organisms by gently and constantly directing a stream of water into a culture of organisms. Agitator 1 is particularly useful for culturing lecithotrophic echinoderm larvae with long developmental times at low ambient temperatures through metamorphosis. Such larvae represent relatively large, buoyant, fragile organisms that are prone to fouling in a standing culture, because the death and subsequent disintegration of a few individuals may result in bacterial overgrowth and anoxic conditions. The apparatus according to the invention provides a space efficient solution in which decaying debris is prevented from accumulating, while healthy individuals are easily collectable, and are able to make contact with the culturing container's walls so that settlement and metamorphosis can occur. While this document discloses, as an example, the culturing of lecithotrophic echinoderm larvae, other types of marine life, particularly invertebrate larvae may also be cultured using the method and apparatus described herein.

Figure 1:
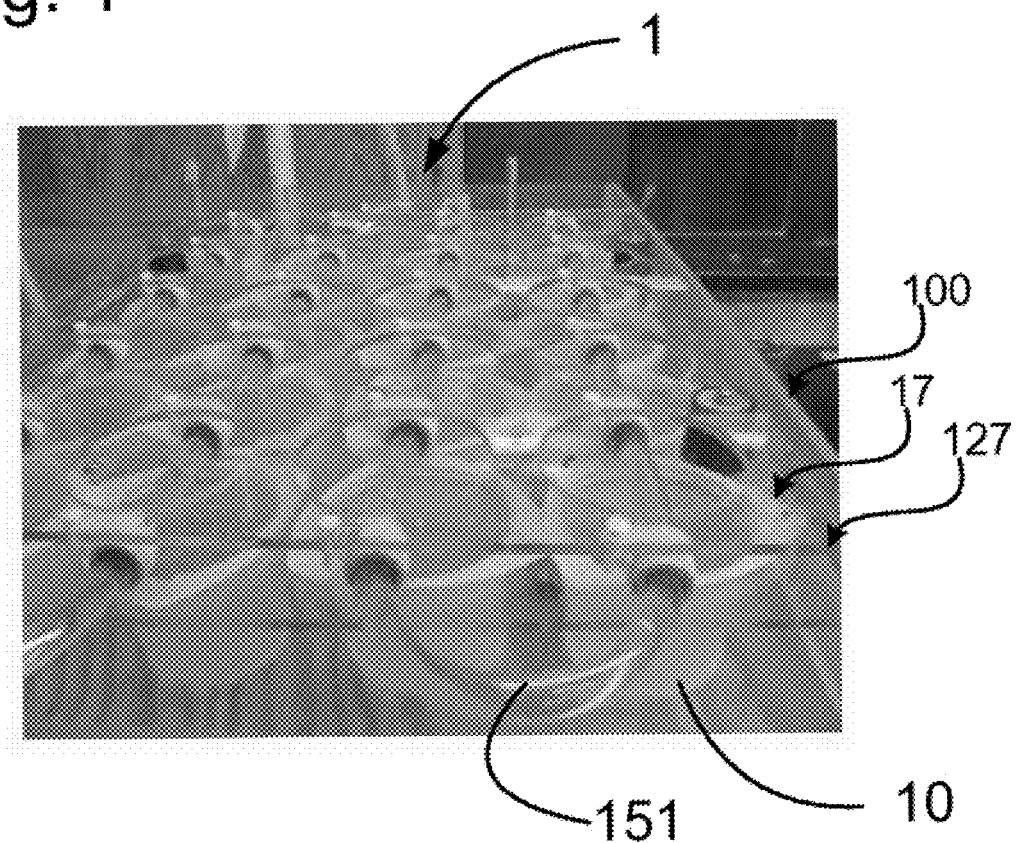
FIG. 1 is a perspective view of the apparatus according to the invention positioned within a sea table.

Agitator 1 is designed for placement in sea table 100, as seen in FIG. 1. A sea table is an enclosure into which running seawater is collected and evacuated at a constant rate and is available at many marine stations and aquaculture facilities. Sea table 100 includes a water conduit, that provides supply tube 15 with seawater. The seawater may be obtained through supply tube 15, from a seawater source, such as the sea or large reservoir, to table 100. Table 100 includes raised edges 127 to hold a volume of seawater. As the water level rises due to the flow of water arriving from water supply tube 15, excess water exits sea table 100 by draining from the bottom of sea table 100 using a stand pipe to maintain an adequate water level. Draining occurs at the same flow rate as seawater enters table 100. In alternative embodiments of the invention, rather than placing agitator 1 within a sea table 100, agitator 1 may be placed within seawater, using flotation devices or the like. In yet another alternative, the water level of sea table 100 may be maintained by allowing the seawater to pass over edges 127.

Agitator 1 may be sized to fit within sea table 100. Agitator 1 includes a plurality of open culture containers 10. In a preferred embodiment of the invention, culture containers 10 are plastic beakers. Each culture container 10 is preferably positioned within sea table 100 so that rim 17 of culture container 10 rests just above the water level 125 of sea table 100. Water is distributed into the plurality of open culture containers 10, and as the pressure decrease in the main water supply tube 15 is less than the pressure decrease in the individual outlet conduits 20, which lead water from water supply tube 15 to each culture container 10 as seen in FIG. 1, the water flow to culture containers 10 is approximately constant, laminar and gentle. Alternatively, a pump could be used to maintain the water flow.

Figure 2:
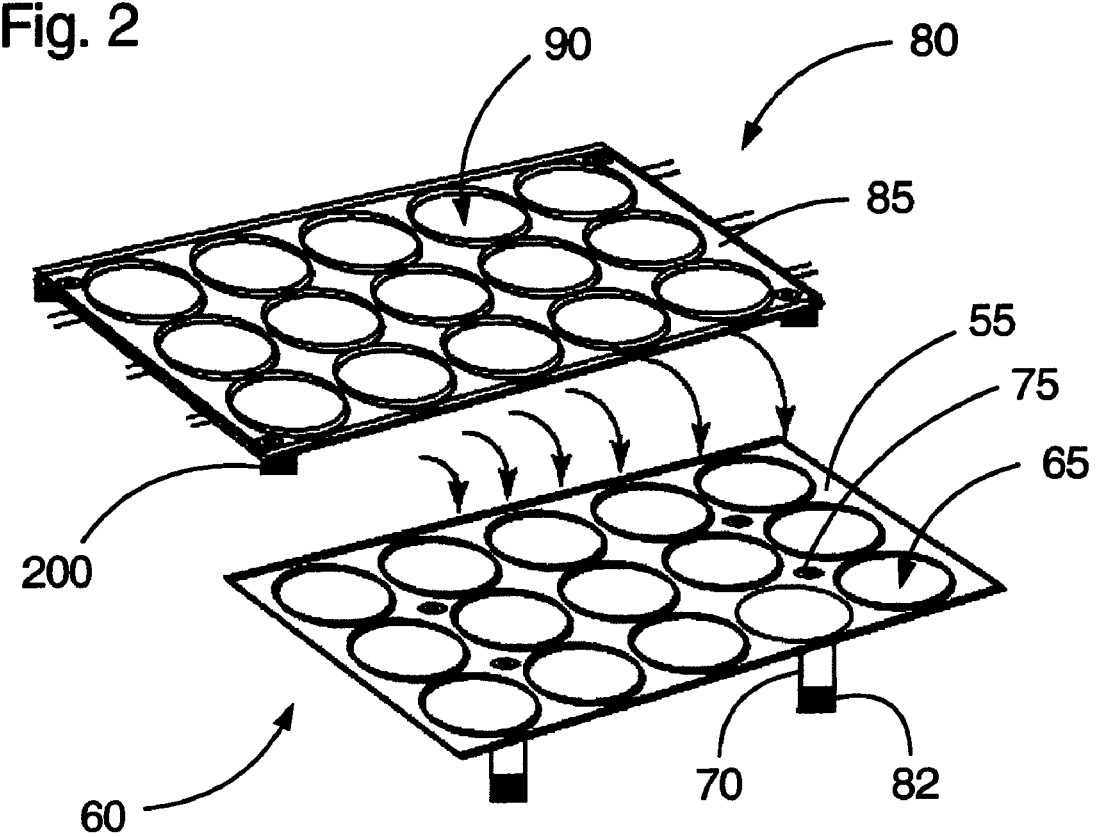
FIG. 2 is a perspective view of the lid and base therein, showing the lid and base separated.
Figure 6:
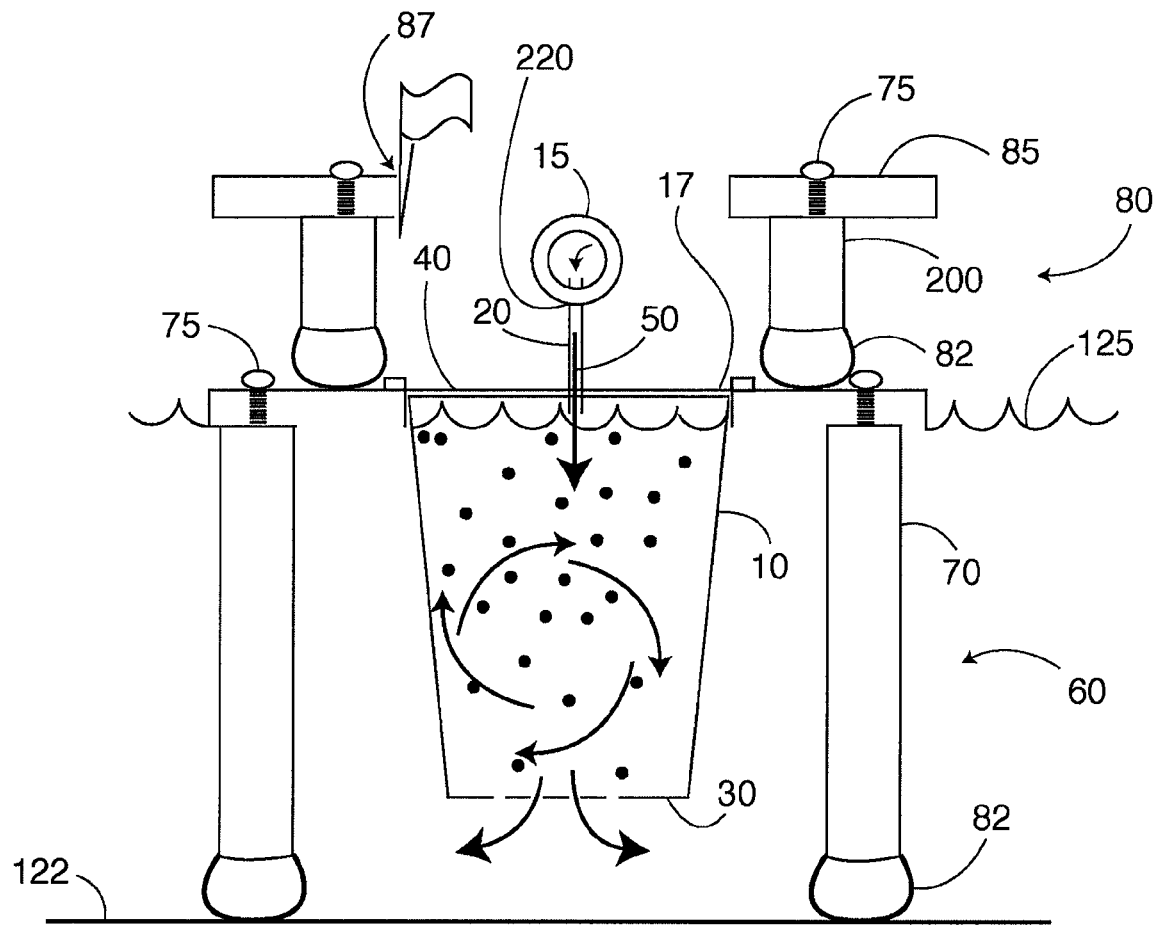
FIG. 6 is a cross sectional side view of a portion of the apparatus according to the invention.

As seen in FIGS. 2 and 6, agitator 1 includes three components: a plurality of culture containers (also referred to herein as beakers) 10 having mesh surface bottoms 30, for holding the organisms (as seen in FIG. 6), a base 60 to position rim 17 of beakers 10 above the water level 125 of sea table 100, and lid 80 to position outlet conduit 20 carrying seawater to culture containers 10 from main supply tube 15. Seawater enters each culture container 10 via main supply tube 15 and outlet conduits 20. Water then exits culture containers 10 via mesh surface 30. Such water flow allows for self-cleaning of culture containers 10 as waste is removed. As shown in the embodiment represented in the Figures, a mesh bottom 30 is used, although more of, or other portions of, culture containers 10 may be mesh. Mesh bottoms 30 allow seawater to pass into the surrounding sea table 100 wherein water level 125 is maintained.

Agitator 1 thereby focuses a stream of seawater into each culture container 10, from through main supply tube 15, above the culture container 10, in the directions indicated by the arrows in FIG. 6, such as downward direction 50, which shows the direction of the water leaving main supply tube 15 via the outlet tube 20 and entering culture container 10. Beaker 10 is of sufficient depth to allow the individual specimens enough room so that they do not impact mesh bottom 30 with excessive force from seawater entering the container 10 from above water level 125. For this reason 800-ml plastic beakers may be suitable, although other sizes of beakers may be used, depending on the marine life being cultivated. If such standard beakers are used, they may be modified for use with the apparatus 1 by removing the bottom of the beaker with a tool, such as a belt sander, and attaching a 340-μm size or appropriate sized nylon mesh for the organism to be cultured in its place using a bonding agent, such as commercial thermoplastic. The mesh size for mesh bottom 30 will vary depending on the organism to be cultured, but it should be smaller than the egg diameter of the organism.

Base 60 of agitator 1 arrays beakers 10 and provides clearance between bottom 30 of container 10 and surface 122 of table 100 so that water may flow away from the culture below container 10, and into the surrounding sea table 100. Base 60 can be sized to fit any sea table or accommodate any number of containers, and may be made of plywood, plexiglass, or a 6-mm polycarbonate sheet 55, as shown in FIG. 2. Large (for example, 10.2-cm) diameter apertures 65 are positioned rows and columns within the sheet 55 to accommodate containers 10. To ensure adequate spacing, apertures 65 should be spaced approximately 2.5 cm, both from each other, and from the edges of sheet 55, as seen in FIG. 2.

Legs 70 of base 60 may be constructed from 2.5-cm (1-inch) diameter acrylic rods or another suitable material. Legs 70 should be of a length so that culture containers 10 do not touch the bottom 122 of the sea table 100 as seen in FIG. 6. Legs 70 are attached to sheet 55, for example with a stainless steel bolt 75. Preferably, legs 70 are not attached to the corners of sheet 55 as this adds stress to the base 60, but are mounted more centrally (for example, within the first row and column on each side of sheet 55 as seen in FIG. 2). Rubber caps 82 or other stoppers may be fitted onto legs 70 to provide a more secure footing on sea table 100, or alternatively, legs 70 may be fixed to sea table 100. Caps 82 can also be used to adjust the height and weight of base 60 by filling caps 82 with a spacer such as sand. The height of base 60 in relation to water level in sea table 100 should be such that culture containers 10 are only partly submerged (as shown in FIG. 6). The water level 125 can also be adjusted by changing the length of the standpipe, rather than changing the height of base 60 as the length of the stand pipe draining water from the sea table 100 determines the height of the water surface 125 in the sea table. Therefore if a shallow depth is desired, the pipe can be shortened.

Figure 3:
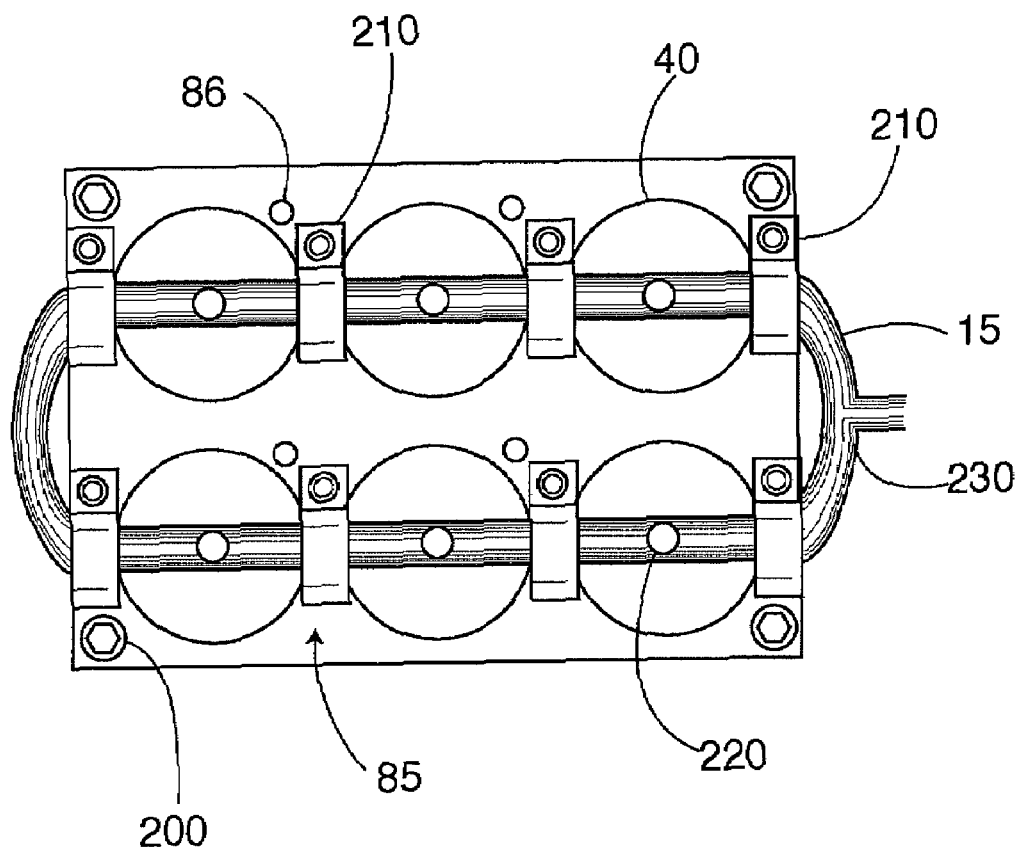
FIG. 3 is a bottom view of the lid thereof.
Figure 4:
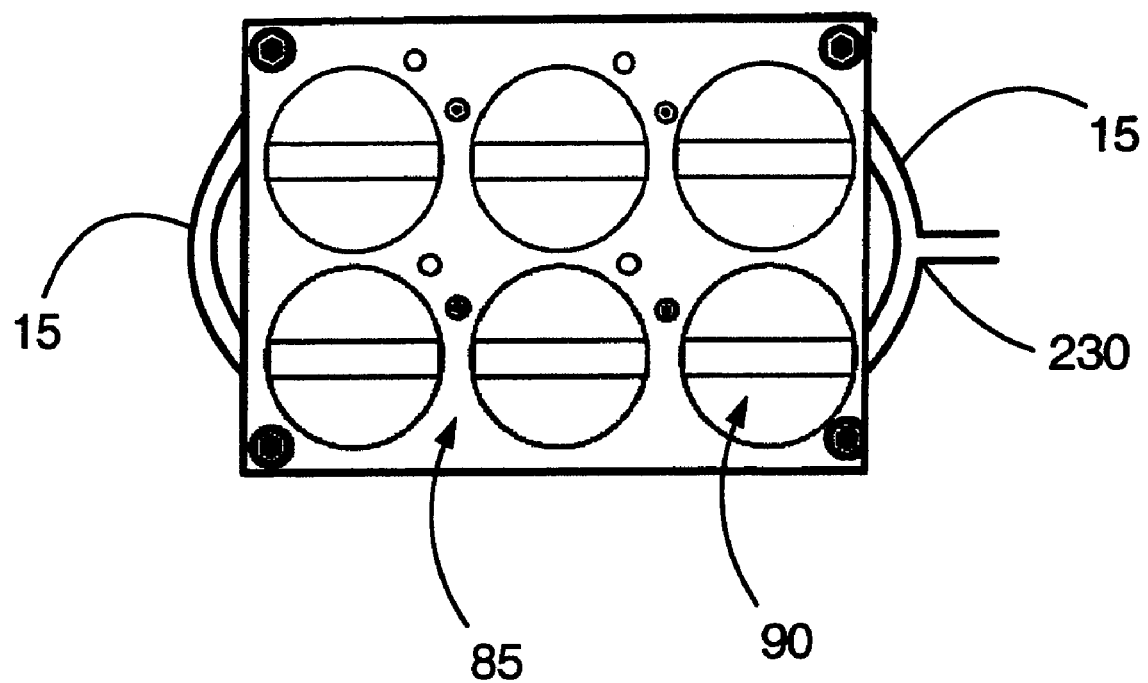
FIG. 4 is a top view of the lid thereof.

As seen in FIGS. 3 and 4, lid 80 provides a scaffold for supply tube 15 and allows access to the cultures within culture containers 10 while agitator 1 is in operation by maintaining a distance between lid 80 and base 60. Lid 80 may be constructed from a polycarbonate sheet 85 that corresponds to base 55, as seen in FIG. 2. As seen in FIG. 6, the edge of apertures 90 within lid 80 can be used to accommodate labels, for example 1-ml plastic pipette tips 84 with tape attached can be used to label simultaneous cultures of different species or individuals fertilized at different times. Alternatively, as seen in FIG. 3, lebales may be inserted in smaller apertures 86 adjacent to each aperture 90. Spacers 200 that may be approximately 5 cm long are used to raise lid 80 above base 60 so that supply tube 15, mounted under lid 80, does not rest on containers 10 mounted in base 60. Rubber leg caps 82 as seen in FIG. 6 can be used to adjust the height of spacers 200 as seen in FIG. 3 as well.

Figure 5:
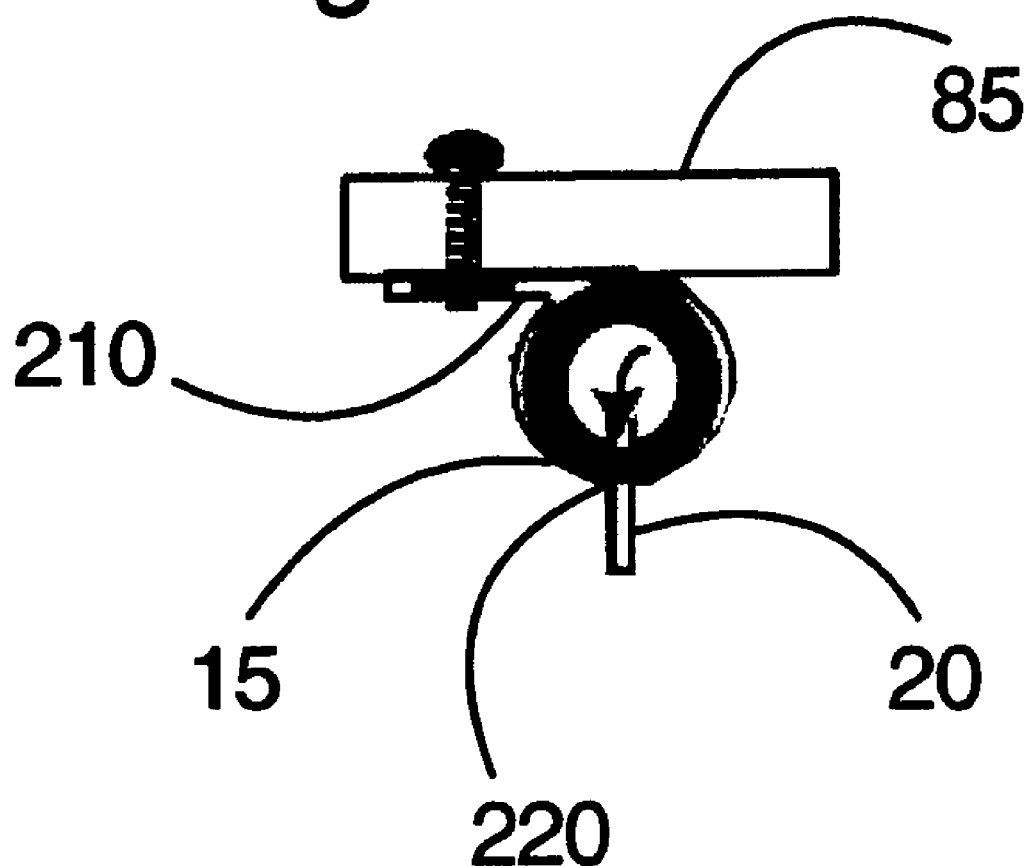
FIG. 5 is a partial side view of the lid thereof showing a clamp fitted around a main supply hose and mounted to the underside of the lid.
Figure 7:
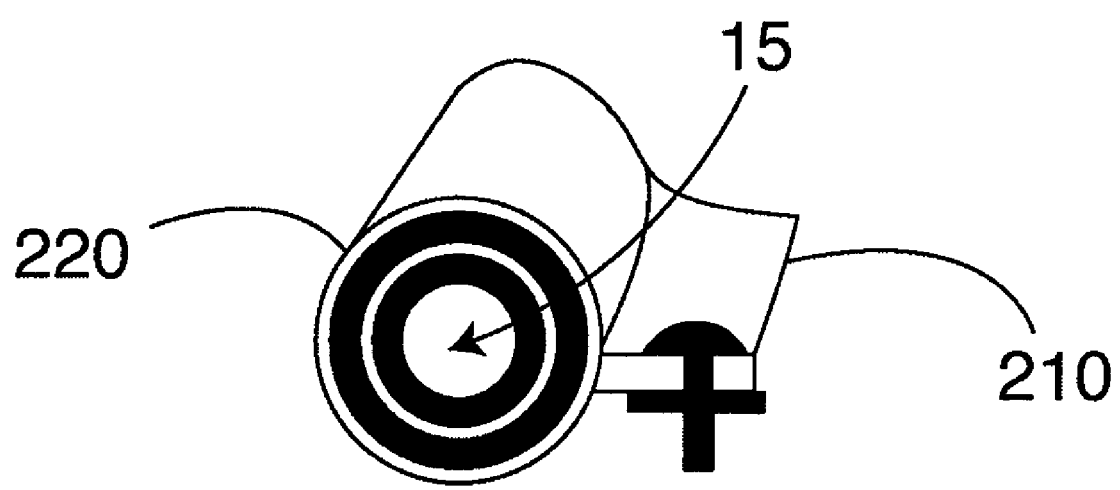
FIG. 7 is a perspective cutaway view of a clamp and piping piece.
Figure 8:
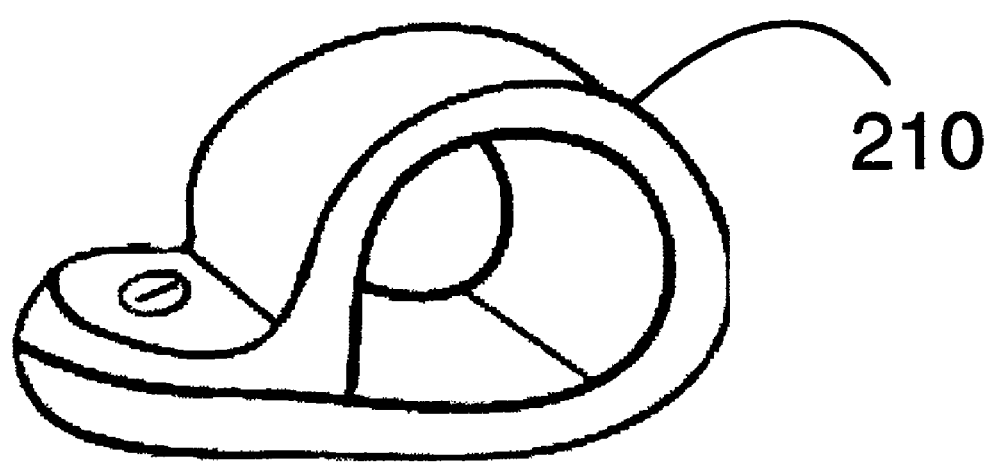
FIG. 8 is an alternate view of a clamp.
Figure 9:
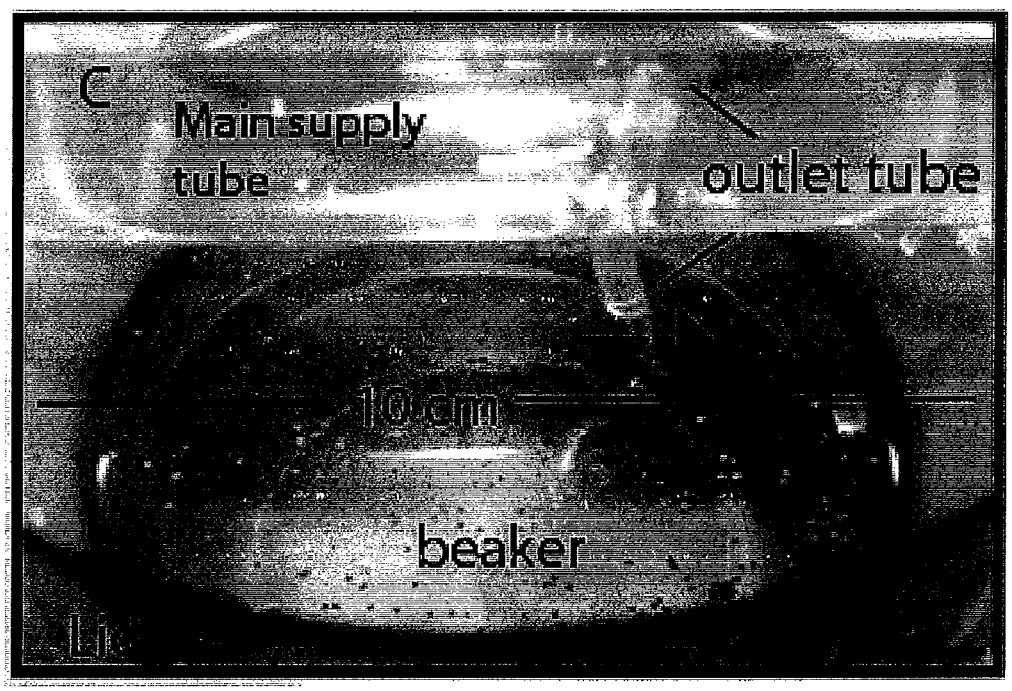
FIG. 9 is a view of a culture container and supply tube.

Clamps 210, positioned between the apertures 65 that accommodate culture containers 10 and at the edges of sheet 55 as seen in FIG. 3, may be used to guide main supply tube 15 over the center of each culture container 10, as seen in FIGS. 1 and 9. To mount clamps 210, small apertures may be provided, for example drilled, into lid 80 to hold a nylon nut and bolt. These apertures may receive clamps 210 (which may be 2.2-cm (⅞-inch) plastic clamps) that anchor supply tube 15, as seen in FIGS. 7 and 8. Clamps 210 may be fitted around the main supply tube 15 with 2.5-cm long, 1.9-cm (¾-inch) diameter PVC pipe portions before clamps 210 are attached to lid 80. Various embodiments of clamps 210 are shown in FIGS. 5, 7 and 8. Pipe portions 240 hold main supply tube 15 more securely than clamp 210 alone. Alternatively, two small apertures may be used to hold supply tube 15 in place with a cable tie (not shown). Other means of holding supply tube 15 to lid 80 may be used including adhesives, tape or ties. Supply tube 15 is positioned at the underside of lid 80 by running it through clamps 210. Preferably, a continuous length of clear plastic tubing is used for supply tube 15, with both open ends joined at a Y connector 230, as seen in FIG. 4. Such a design allows for maintenance of approximately equal pressure throughout the entire system. Preferred tubing may be a tube with a 1.6-cm (⅝-inch) outer diameter, and 0.95-cm (⅜-inch) inner diameter.

After tube 15 is aligned over each beaker 10 using clamps 210, small apertures 220 positioned at the underside of supply tube 15 are used to direct water into containers 10. Apertures 220 may have a 0.4-cm diameter. Preferably each aperture 220 is positioned above the center of a culture container 10. When preparing agitator 1 for use, it is preferable to drill apertures 220 into supply tube 15, after supply tube 15 is secured to clamps 210 so that tube 15 does not twist, upsetting the downward orientation of apertures 220. Outlet conduits 20 may be placed through apertures 220, to ensure that the flow of water into container 10 is gentle. Examples of such a gentle flow may include a fast drip, or a minimal continuous flow (i.e. just greater than a constant fast drip). Outlet conduits 20 may be VWR select grade plastic PVC tubes with a 0.4-cm (⁵⁄₃₂-inch) outer diameter, and 0.24-cm (³⁄₃₂-inch) inner diameter. The length of outlet conduits 20 is preferably sufficient so that the water exits outlet conduit 20 between a positioned submerged beneath water level 125, to within about 1-cm above water level 125, depending on the desire to break the surface tension of the water and the level of agitation.

Both ends of supply tube 15, once secured to clamps 210, are connected to Y connector 230, which then leads to a seawater source. An inline filter may be placed between the water source and the Y adaptor 230 to remove large debris, which may otherwise collect in culture containers 10 over time. The inline filter should have a nylon mesh of a smaller size than that used for the base 30 of culture containers 10 (for example, a 200-μm mesh). A disc of such a nylon mesh can be cut to fit the inline filter.

Agitator 1 therefore allows the containers 10 to be cleared of debris and waste while keeping larvae intact and is therefore self-cleaning, i.e. the necrotic (dead) larvae do not need to be removed from the container using other means. Agitator can supply a very smooth stream of water that is sufficient to clear oily residue from decaying tissue but gentle enough to move the organisms within container 10 thereby mimicking movement patterns in the ocean within a small space.

Operation of the Agitator

The desired level of water flow can be controlled using a stopcock or valve near the seawater source. Preferably the water flow is gentle, for example a rate of between 2 to 2.5 liters per minute from the water source to supply tube 15. The preferred flow from outlet conduits 20 to culture containers 10 is maintained at a gentle minimal flow. The larvae in beakers 10 do not need to be in constant motion for agitator 1 to be effective and water flow may be minimized so that the cultures are not agitated too vigorously. Outlet conduit 20 may be slightly bent to establish a cyclical stirring action within culture container 10. Outlet conduits 20 may also be inserted deeper into main tube 15 to slow water flow. In cases where apertures 65 do not contain a container 10, individual outlet conduits 20 may be blocked, for example using a cork fitted into a conduit 20 or aperture 220, or valves. A plastic pipette tip inserted into a flexible outlet conduit 20, and the submergence of outlet conduit 20 beneath the water level, slows the flow of water to minimize agitation, thereby allowing competent larvae to settle.

Individual specimens can be removed in small numbers from culture container 10 with a pipette as lid 80 allows access to agitator 1 via aperture 90 while it is pressurized and water is flowing through main tube 15. Cultures can be removed from agitator 1 easily so that they can be observed, fixed, or culture containers 10 cleaned. To collect an entire culture quickly for sorting or study, lid 80 can be removed and culture containers 10 lifted out of base 60 so that only a small amount of water remains in culture container 10. The larvae or embryos can then be easily collected with a large pipette or turkey baster.

It may be important to keep components of agitator 1 clean. For example, an inline filter in supply tube 15 may acquire a build up of particulate matter. Bubbles trapped over the outlet apertures 220 of main supply hose 15 during filter changes may block the flow of water. Supply hose 15 may therefore be bled by temporarily increasing the flow of water after replacing the filter. If a heavy biofilm builds up in the culture container meshes 30, they may be rinsed if the larvae have not reached the stage at which metamorphosis is imminent.

Experiment

An agitator according to the invention was used to culture the larvae of a starfish, *Solaster stimpsoni* (Verrill). A total of 56 beakers were used as culture containers in four separate agitators (three 12-beaker arrays and one 20-beaker array using a total of two sea tables). After fertilization, the embryos were immediately transferred into the agitator. The starfish larvae were cultured at densities of up to 300 individuals per 800-ml beaker through metamorphosis and the juvenile stage (6 wks at an ambient temperature of 10° C.), although longer culture periods are possible. The agitator successfully cultured approximately 16,000 larvae during two field seasons at the Friday Harbor Laboratories (Friday Harbor, Wash.). The mortality rate was not precisely measured but no significant or dramatic reduction from the initial egg number was observable and the young starfish survived in great numbers. After nine days at 10° C., the larvae of *Solaster stimpsoni* developed adhesive disks and larval arms with which they attached either to the mesh or the walls of the beaker without the need to add settlement cues.

Applications and Modifications

The apparatus was also used to culture larvae of a holothurian, *Psolus chitonoides* (Clark), which resemble those of *S. stimpsoni* in terms of fragility and developmental mode. In addition to culturing lecithotrophic larvae, the agitator could also be used for a variety of other purposes, such as culturing small and delicate zooplankters including ctenophores, polychaete epitokes, or egg masses. Once juveniles hatch from the egg masses, they can be immediately cultured in the same container as the egg mass. It is also possible to raise planktotrophic larvae and conduct experimental manipulations of culture conditions. Such larvae could be reared within the apparatus by using a smaller mesh size and inserting a small catheter connected to an IV drip bag filled with algae into the main supply hose 15. Alternatively, the water flow could be temporarily stopped and food added to the sea table. Treated water sources (carrying predator cues etc.) could be added to a culture via the same methods or by siphoning water from an aquarium harboring the predator into the main hose of the agitator. The construction of a sea table that is subdivided to prevent the cross-contamination of seawater along with the deployment of separate (and smaller agitators) may also be used.

Although the particular preferred embodiments of the invention have been disclosed in detail for illustrative purposes, it will be recognized that variations or modifications of the disclosed apparatus lie within the scope of the present invention. In particular, there are numerous ways of introducing a gentle flow of water to the containers without departing from the spirit of the invention.

I claim:

1. An apparatus for culturing individuals of a marine species, comprising:

a base, said base supporting a plurality of beakers, each of said beakers supported within a corresponding aperature on said base, a bottom surface of each of said beakers submersible within a sea table and above a surface of said sea table, said surface of each said beakers having a mesh portion;

a tube, said tube providing a flow of seawater from a seawater source to each of said beakers, said tube having a plurality of apertures, each of said tube apertures positioned above one of said plurality of beakers, each of said plurality of tube apertures holding a water conduit for providing a stream of seawater from said tube to said beaker; and a lid positioned above said base, said lid positioning said seawater supply, said lid having a plurality of apertures, each of said plurality of apertures on said lid alignable with said apertures on said base, thereby allowing access to said beaker;

wherein said mesh portion is sized to allow passage of said seawater through said beakers but prevent passage of said individuals.

2. The apparatus of claim 1 wherein said plurality of beakers each have a lip, said lips positionable above a water level of said sea table.

3. The apparatus of claim 1 wherein a plurality of clamps below said lid positions said water conduit.

\* \* \* \* \*